United States Patent
Boonstra et al.

(10) Patent No.: US 7,173,563 B2
(45) Date of Patent: Feb. 6, 2007

(54) CALIBRATION METHOD, DEVICE AND COMPUTER PROGRAM

(75) Inventors: Albert Jan Boonstra, Assen (NL); Alle Jan van der Veen, Delft (NL)

(73) Assignee: Stichting Astron, Dwingeloo (NL)

(*) Notice: Subject to any disclaimer, the term of this patent is extended or adjusted under 35 U.S.C. 154(b) by 0 days.

(21) Appl. No.: 10/525,147

(22) PCT Filed: Aug. 16, 2002

(86) PCT No.: PCT/NL02/00552

§ 371 (c)(1),
(2), (4) Date: Aug. 22, 2005

(87) PCT Pub. No.: WO2004/017090

PCT Pub. Date: Feb. 26, 2004

(65) Prior Publication Data

US 2006/0114147 A1 Jun. 1, 2006

(51) Int. Cl.
*G01S 7/40* (2006.01)

(52) U.S. Cl. .................. 342/360; 342/174; 342/188

(58) Field of Classification Search ............... 342/165, 342/174, 360, 378, 382, 188, 189
See application file for complete search history.

(56) References Cited

U.S. PATENT DOCUMENTS

| 5,929,810 A * | 7/1999 | Koutsoudis et al. ........ 342/373 |
| 6,239,747 B1 | 5/2001 | Kaminski ................... 342/442 |

OTHER PUBLICATIONS

Leshem et al, "The effect of blanking of TDMA Interference on radio-astronomical correlation measurements", Proceedings of the 11th IEEE Signal Processing Workshop on Statistical Signal Processing, Aug. 6-8, 2001, pp. 190-193.

Leshem et al, "Multichannel Detection and Spatial Signature Estimation With Uncalibrated Receivers", Proceedings of the IEEE Signal Processing Workshop on Caesarea, Jun. 14-16, 1999, pp. 25-29.

* cited by examiner

*Primary Examiner*—Dao L. Phan
(74) *Attorney, Agent, or Firm*—Michaelson & Associates; Peter L. Michaelson

(57) ABSTRACT

A method for calibrating parameters of sensor elements in a sensor array. The method comprises receiving an output signal of at least two sensor elements signal in reaction to an input signal from a signal source; estimating a cross-correlation between the output signals of at least two of said sensor elements; and optimising a difference between the estimated cross-correlation and a cross-correlation model; and thereby estimating said parameters from the optimised difference. A cross-corelation model is used as represented by the mathematical equation: $R = G\,B\,G^H + D$.

22 Claims, 3 Drawing Sheets

CALIBRATION METHOD, DEVICE AND COMPUTER PROGRAM

TECHNICAL FIELD AND BACKGROUND OF THE INVENTION

The invention relates to a method and a device for calibrating parameters of sensor elements in a sensor array. The invention also relates to a computer program product for calibrating parameters of sensor elements of a sensor array when run on a programmable device and to a sensor array calibrated with a calibration method.

In sensor array systems, the, complex, receiver gains and sensor noise powers of the sensor elements in the sensor array are initially unknown and have to be calibrated. (Gain) calibration enhances the quality, specifically the sensitivity, of the sensor system and, moreover, improves the effectiveness of array signal processing techniques for interference mitigation.

Non-polarized and single polarization calibration techniques for sensor array systems are generally known in the art [1, 2, 3, 5, 13], and the statistical performance also is a well studied topic [1, 2, 3, 5, 8, 13, 14]. Recently, Hamaker, Bregman and Sault [10, 11, 12] developed, for radio astronomical purposes, a polarization formalism in which the polarization state of the received signal, and the propagation of these signals through the atmosphere and through the sensor array, were thoroughly and elegantly incorporated. This formalism is based on optics [15, 16] and on extensions of the (approximate) solutions in radio polarimetry [17, 18].

In this formalism, the polarized signal is described by a 2×2 size Stokes matrix [17, 18] (a Stokes matrix describes the polarization state of the signal: intensity, linearity, ellipticity, polarization angle, total polarization), and the distorting and propagation effects by a 2×2 size Jones matrix [10, 11, 12] which in general is different for each of the dual polarization array sensors. The output of a dual polarization channel is described by a multiplication of Jones and Stokes matrices. The polarized array formalism is further focussed on pair-wise correlation products involving 2×2 size Jones and Stokes matrices. However, solving systems based on this formalism require an iterative approach and convergence is not always guaranteed. Hence, in such systems stability is a problem as well.

The single polarization and non-polarized sensor array parameter estimation problem is well known from literature [2, 13]. However, these calibration methods are disadvantageous because they require a large amount of processing. They also require a good initial point (gain and noise values), which is not always available. Typically, the number of processing steps involved scales with the third power of the number of sensor elements.

Recently, fast and closed form single polarization calibration techniques were described in [1]. In this publication, the calibration techniques involves the comparison of an estimated signal with a signal outputted by telescopes in a telescope array. By optimisation of the estimated signal with a least square error minimalisation of the difference between the estimated and outputted signal, the gains of the telescopes can be derived. In the publication [1] several variants of the least square error minimalisation are described. One of the minimalisations is a logarithmic minimalisation, in which difference of the logarithms of the covariance of the estimated signals and the covariance of the outputted signals are compared.

The number of processing steps for the logarithmic minimalisation described in [1] scales with the square of the number of elements and is thus much much faster than conventional methods. However this logarithmic minimalisation has the disadvantage that, for unequal gains, the method is not efficient, which means that the estimation accuracy is lower than the theoretical bound.

SUMMARY OF THE INVENTION

It is a goal of the invention to provide a better calibration method, more specific it is a goal of the invention to provide a numerically stable calibration method by providing a method for which closed form solutions exist for non-polarized, single polarization, and dual polarization sensors.

Therefore, the invention provides a calibration method according to claim 1.

For a method according to the invention closed form estimation solutions exist. Thereby, the parameters can be estimated in a single and stable process.

In one embodiment, a method according to the invention is applied to the calibration of a dual polarised sensor array, that is an array for the reception of dual polarised signals. For polarised signals in particular, a method according to the invention gives new insights in the gain estimation issue, specifically, new (closed form) solutions to the estimation problem now become available. Furthermore, a dual polarization calibration method according to the invention has the advantage that closed form solutions exist. Such a system is numerically more stable than the known calibration systems In another embodiment, a method according to the invention is applied to a single polarization or a non-polarized sensor array and a weighted logarithmic minimalisation is used to estimate the parameters. It can be shown, that this embodiment, for low SNR, is asymptotically efficient. Thus, for a large number of data samples, the estimator is efficient for low SNR. The improvement is larger for larger gain differences, thus the embodiment is especially suited for sensor arrays with large unequal gain magnitude differences.

Furthermore, the invention provides a calibration system according to claim 17. Also, the invention provides a calibrated sensor array according to claim 20.

The invention also provides a computer program product according to claim 21. Such a computer program enables a programmable device to calibrate a sensor array in a stable manner when the program is run on the programmable device.

Specific embodiments of the invention are set forth in the dependent claims. Further details, aspects and embodiments of the invention will be described with reference to the attached drawing.

DETAILED DESCRIPTION

In the following description of examples of embodiments of the invention, the following notation is used. Bold capital letters indicate matrices, bold lowercase letters represent vectors, and non-bold letters (either lowercase or uppercase) indicate scalars. Matrix and vector elements are denoted by subscripts. The subscript n denotes the n-th observed time sample. Superscript * denotes the complex conjugate. Superscript t denotes the vector or matrix transpose, which is an operation which switches the columns and rows of the matrix or vector, i.e. $((R^t)_{ij}=R_{ji})$. Superscript H denotes the Hermitian (conjugate) transpose of a matrix $((R^H)_{ij}=((R^{*t})_{ji}=R^*_{ji})$. Re{ } represents the real part, Im{ } the imaginary part and i is the square root of −1. E{ } denotes the expected value of the covariance matrix. $x_n$ denotes the output vector at time n. Dual polarization vectors and matrices are represented by slanted letters; for the single polarization case non-slanted letters are used. The number of single or dual polarization array sensors is denoted by p.

EXAMPLE A

Polarization Calibration

In the following, by way of example, a gain calibration system and a method according to the invention are described in a radio-astronomy application. However, the invention is by no means limited to applications in radio-astronomy and may likewise be applied in other fields, such as for example array signal processing systems in which a, dominant, point like emitting source with an arbitrary polarization state is present, such as for example satellite tracking phased arrays or otherwise. The method is based on observations of three separate or consecutive (polarized or non-polarized) point-like signal sources.

For one signal source, R represents the 'true' or expected 2p×2p covariance matrix (of the 2p×1 dual polarization array output vector $x(t)=(x_1^x(t), x_1^y(t), \ldots, x_p^x(t), x_p^y(t))$, thus:

$$R = E\{x(t)x(t)^H\} \quad (A1)$$

The polarization properties of the source [15, 16, 17, 18] are represented by a 2×2 (Stokes) matrix B, the 2p×2p noise matrix D is defined by $D=E\{d(t)d(t)^H\}$, and $d(t)=(d_1^x(t), d_1^y(t), \ldots, d_p^x(t), d_p^y(t))$, where $d_i^x(t)$ and $d_i^y(t)$ indicate the sensor noise. D may be either diagonal (in case of a perfect insulation between the two polarizations of a dual sensor) or block diagonal (in case of a leakage between the two polarizations of a dual sensor). G represents the polarization gain matrix of dimensions 2p×2.

Figure 1:
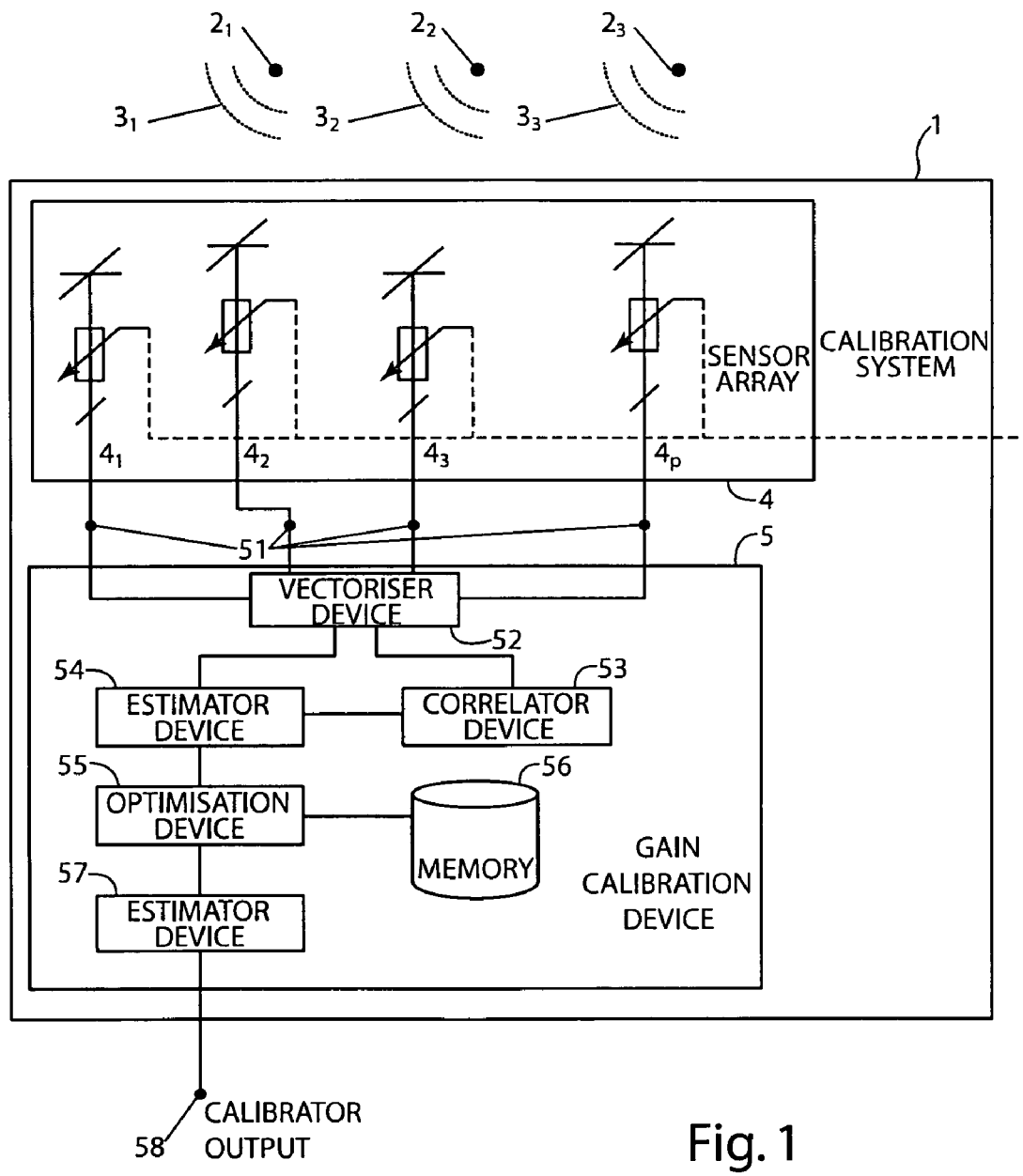
FIG. 1 schematically shows an example of a first embodiment of a dual polarization calibration system according to the invention.

FIG. 1 shows a dual polarization sensor array with 2 p sensors elements by way of example of a system 1 according to the invention. The system 1 is able to perform the example of a method according to the invention illustrated in FIG. 2. In FIG. 1, three point-like sources $2_1$, $2_2$, $2_3$ emit consecutively each a signal $3_1$, $3_2$, $3_3$ to the system 1. In step 101 in FIG. 3, each of the three consecutive signals $3_1$, $3_2$, $3_3$ is observed separately by a number of dual polarization sensor elements $4_1, 4_2, \ldots, 4_p$ (p representing the total number of dual polarization sensor elements) of a sensor array 4, which may for example (but not necessarily) be an uniform linear sensor array. The outputs of the sensor elements $4_1, 4_2, \ldots, 4_p$ are connected to inputs 51 of a gain calibration device 5. The outputs of the sensor array are further, as indicated with the striped lines to a, not shown, beamformer device as is for example known in the arts of radars, acoustic arrays, and radio-astronomy.

The output signals x(t) contain the input signal s(t) of a single source multiplied with a (complex) number $a_r$ which represents the path time delay for the respective sensor elements $4_i$. The signal s(t) also multiplied with a gain factor $G_i$ of the respective sensor element $4_i$. The output signal $x_i(t)$ also comprises system noise $d_i(t)$ added in each sensor element $4_i$ to the signal s(t).

Each dual polarization sensor $4_1, 4_2, \ldots, 4_p$ comprises two sensor elements, one for each polarization component in the signals $3_1$–$3_3$. Thus, the total number of sensors elements in the system 1 is 2p. In steps 102 and 103, the output signals $x_i^x(t)$ resp. $x_i^y(t)$ are presented at the outputs of the dual polarization array sensor elements $4_1, 4_2, \ldots, 4_p$, where $x^x$ is the output signal for one polarization component of the input signal, and $x^y$ is the output signal for the other polarization component of the input signal.

In the described examples, it is assumed that the look direction, i.e. the direction of the source 2 with respect to the sensor array 4, is known. Thus, without loss of generality, the path time delay $a_r$ can be set to 1, e.g. the delay is taken to be the same for all sensor elements. However, the invention may likewise be applied if the path time delay differs for some or all sensor elements. The inputs 51 are communicatively connected to a vectoriser device 52, In step 104 the output signals $x_i(t)$ are stacked in the output vector $x(t)=(x_1^x(t), x_1^y(t), \ldots, x_p^x(t), x_p^y(t))$ by the vectoriser device 52.

Figure 3:
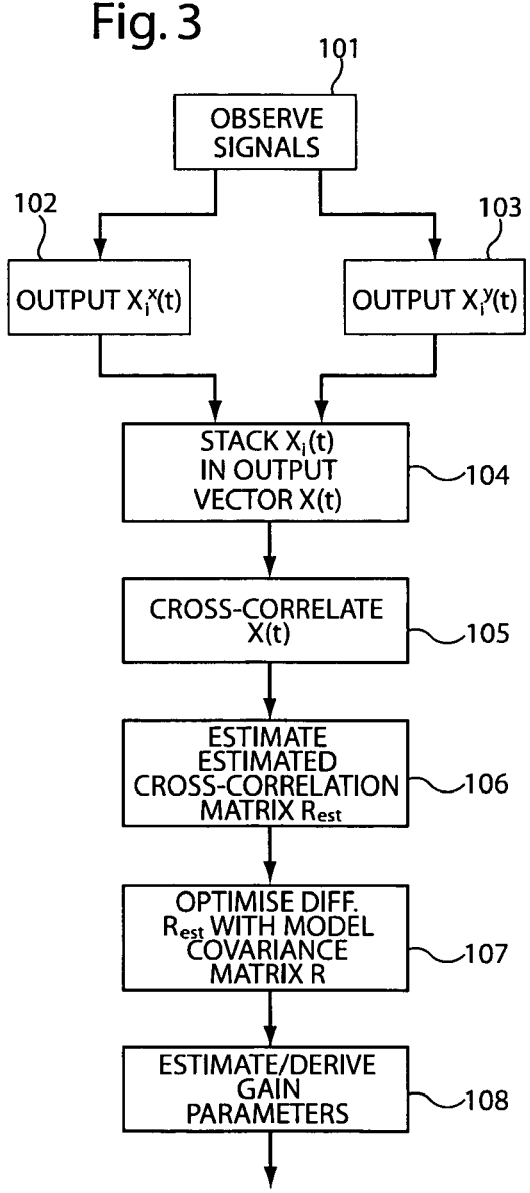
FIG. 3 schematically shows a flowchart of an example of a calibration method according to the invention.

Connected to the vectoriser device 52 is a correlator device 53 which is able to cross-correlate, in step 105 in FIG. 3, elements in the output vector x(t). In the shown correlator device 53, a covariance matrix is formed by determining the covariance of the element outputs $x_i(t)$. However other correlation methods may be used as well. After steps 101–105, the gain parameters, as represented by a matrix G of size 2p×2 (except for an arbitrary phase offset term), are estimated in steps 106–108 and further, by solving cost functions, each cost function corresponding to a different one of the input signals $3_1$, $3_2$, $3_3$.

The calibration device 5 further comprises a estimator device 54 connected to the cross-correlator device 53, which is able to estimate an estimated cross-correlation In step 106, the estimated cross-correlation matrix $R_{est}$ is estimated by the estimator 54 from the covariance matrix established by correlator device 53. However, the estimator device 54 may likewise estimate the cross-correlation in a different manner In step 107, an optimisation device 55 communicatively connected to the estimator device 54, compares the estimated covariance matrix $R_{est}$ with a model of the covariance matrix R stored in a memory 56.

In the example, in step 107 a difference between the cross-correlation model and the estimated cross-correlation matrix $R_{est}$ is optimised, by minimising the difference, which difference is also referred to as the estimation error. In step 108 the gain parameters are estimated or derived from the result of step 107. In the example of FIG. 3, in step 106 the gain parameters are derived from the optimised difference between the estimated matrix and the model by a gain estimator device 57. The estimator device 57 is connected to the optimisation device 55. The estimator device 57 is also connected to an calibrator output 58, via which the estimated parameters can be transmitted further to be used in further processing such as the processing of signals received at the sensor elements after the calibration.

In the example of a device of FIG. 1 and the example of a method of FIG. 3, as a cross-correlation model, a model of the covariance matrix R is used. The covariance matrix $R_1$ for one source can be expressed as:

$$R_1 = G B_1 G^H + D \quad (A2)$$

and for Q sources the covariance matrix R can be expressed as:

$$R = \{\Sigma_{m=1 \ldots Q} G B_m G^H\} + D. \tag{A3}$$

Using the model of equations A2 and/or A3, given an estimate covariance matrix $R_{est}$, for one or more consecutive sources, the gain matrix G and noise matrix D can be estimated. In this example, in step 106 an estimate of the covariance matrix $R_{est}$ is obtained by the estimator device 54 by forming the product:

$$R_{est} = (1/N) \Sigma_n x(t_n) x(t_n)^H \tag{A4}$$

Thus, in this example A, the estimated covariance matrix $R_{est}$ is a time averaged covariance matrix of the output signals. However, it is likewise possible to estimate the covariance matrix in a different manner.

It can be shown [12] that for a system of three differently polarized sources an unambiguous or unique gain solution can be obtained (apart from an arbitrary phase offset valid for the entire system). The polarized gain can be found by solving in steps 107 and 108 the equation:

$$\{G, D\} = \arg\min G, D\{(\|R_{est,1} - \{GB_1 G^H + D\}\|_F)^2 + (\|R_{est,2} - \{GB_2 G^H + D\}\|_F)^2 + (\|R_{est,3} - \{GB_3 G^H + D\}\|_F)^2\} \tag{A5}$$

Here the subscript F means the Frobenius norm, which is the square root of the sum of the squares of all matrix elements. Thus, the added least square differences between the estimated covariance matrices for output signals resulting from input signals from three sources and the corresponding covariance matrix models are optimised. However, it is likewise possible to optimise the difference in a different manner. The estimated gain and noise parameters of the sensor elements are then estimated to be the gain and noise parameters for which equation (A5) is solved.

As an example of the solution of eq. (A5), a rank two factor analysis approach may be used, as is briefly described below. However, other more or less standard solutions for the equation (A5) exist and the invention is not limited to the example described below. Solutions for equations similar to eq. (A5) are generally known in the art. The example method starts with solving:

$$R_1 = G B_1 G^H + D \tag{A6}$$

for the estimated covariance matrix $R_{est,1}$ of the first signal.

This can be carried out by applying a rank two factor analysis [6] to submatrices M of $R_{est,1}$ (both M and $R_{est,1}$ are rank two), in which the main (block) diagonal of $R_{est,1}$ is not included as it contains the system noise as well. A resulting (rank 2) matrix A-can be formed, based on the obtained M's, with the property that, for the off (block) diagonal elements, $AA^H$ is equal to R. D can be obtained by calculating $R_{est,1} - AA^H$.

The next step is to calculate the matrix root of B so that equation [A6] can be expressed as:

$$R = (GB^{1/2})(GB^{1/2})^H + D \tag{A7}$$

With the factor analysis approach, described above, a $GB^{1/2}$ factor can be found. The problem here is that the solution is not unique as any unitary matrix can be inserted in equation A7 (between the two $GB^{1/2}$ factors) without affecting R. It can be shown that equations like equations A6 and A7 can be fully solved (up to a single arbitrary phase offset) by using three subsequent, independent, observations ($R_{est,1}$, $R_{est,2}$, and $R_{est,3}$) of emitting point sources with different polarization states using a generalized eigenvalue analysis and the pseudo inverse.

EXAMPLE B

Gain Calibration by Weighted Logarithmic Estimation

Figure 2:
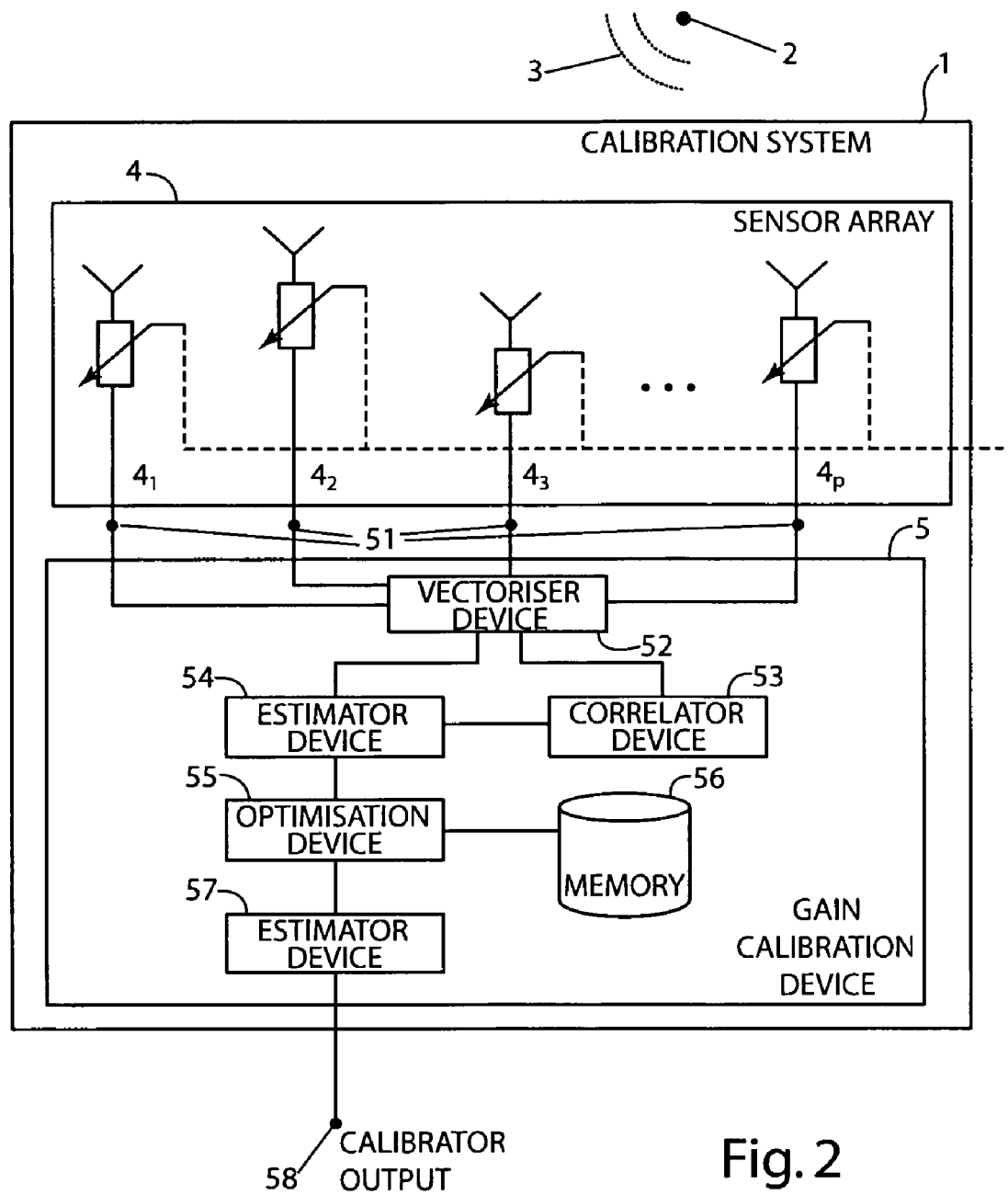
FIG. 2 schematically shows an example of second embodiment of a single polarization or non-polarized calibration system according to the invention.

In FIG. 2, an example of a system 1 according to the invention is shown. In FIG. 2, a point-like source 2 emits a signal 3 to the system 1. The system 1 comprises sensor elements $4_1, 4_2, \ldots, 4_p$ (p representing the total number of sensor elements) of a sensor array 4, for example (but not necessarily) a uniform linear array. The sensor elements receive an input signal s(t) which stems from the signal 3. At the outputs of each of the array sensor elements $4_1, 4_2, \ldots, 4_p$ an output signal $x_i(t)$ is presented. The outputs of the sensor elements $4_1, 4_2, \ldots, 4_p$ are connected to a gain calibration device 5.

The output signals $x_i(t)$ contain the input signal $s_i(t)$ multiplied with a (complex) number $a_\pi$ which represents the path time delay for the respective sensor element $4_i$. The signal $s_i(t)$ is also multiplied with a gain factor $g_i$ of the respective sensor element $4_i$. The output signal $x_i(t)$ also comprises system noise $d_i(t)$ added in each sensor element $4_i$ to the signal $s_i(t)$.

Figure 4:
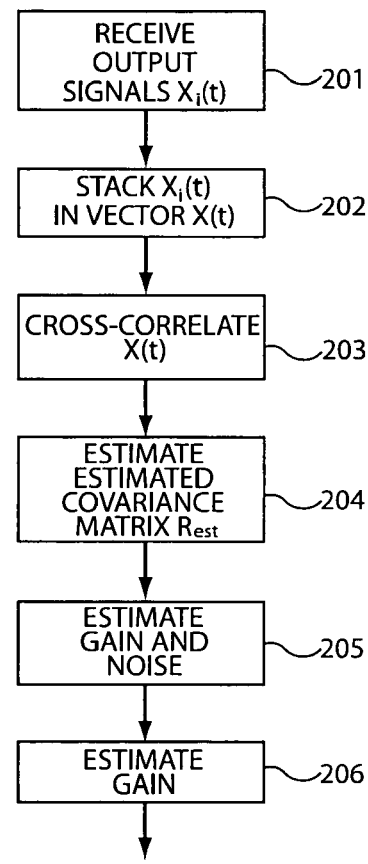
FIG. 4 schematically shows a flowchart of an example of a calibration method according to the invention.

The gain calibration device 5 is able to perform the example of a method according to the invention of FIG. 4. The calibration device 5 has a number of inputs 51 connected to the outputs of the sensor elements $4_1, 4_2, \ldots, 4_p$. In step 201, the output signals $x_i(t)$ are received from the sensor elements. The inputs are communicatively to a vectoriser device 52 in which in step 202 the output signals $x_i(t)$ are stacked in a vector, denoted by bold lowercase letters: $x(t) = [x_1(t), \ldots, x_p(t)]^t$.

In the following, it is assumed that the look direction, i.e. the direction of the source 2 with respect to the sensor array 4, is known. Thus, without loss of generality the path time delay $a_\tau$ can be set to 1, e.g. the delay is taken to be the same for all sensor elements. However, the invention may likewise be applied if the path time delay differs for some or all sensor elements. The array output vector x(t), under the assumption mentioned above, can be described as x(t)=g s(t)+d(t), where d(t) is a vector containing the array noise signals $d_1, d_2, \ldots, d_p$ and where g denotes the (complex) array gain factors $g_1, g_2, \ldots, g_p$ of the sensor elements $4_1, 4_2, \ldots, 4_p$.

Connected to the vectoriser device 52 is a correlator device 53 which is able to cross-correlate, as in step 203 in FIG. 4, the elements in the output vector x(t). In the shown correlator device 53 a covariance matrix is formed by determining the covariance of the element outputs $x_i(t)$. However other cross-correlation methods may be used as well. The true covariance matrix R is the expected value of the covariance matrix, thus:

$$R = E\{x(t)x(t)^H\} \tag{B1}$$

The calibration device 5 further comprises a estimator device 54, which is able to estimate an estimated cross-correlation, as in step 204 in FIG. 4. In the shown example, the estimated covariance matrix $R_{est}$ is estimated by taking the, weighted, time-average of the covariance matrix of the output signals $x_i(t)$ from the correlator device 53. However, the covariance matrix can likewise be estimated in a different manner. In the shown example, the estimated covariance matrix $R_{est}$ can mathematically be described as:

$$R_{est} = (1/N)\Sigma_n x(t_n) x(t_n)^H \quad (B2)$$

In which equation (B2), N represents the total number of the output vector x(t). Since the noise is uncorrelated to the source signal, the covariance matrix R can be modelled, see reference [1], as:

$$R = g\, g^H + D \quad (B3)$$

Here, the noise contribution is represented by a diagonal matrix D with the noise variance on the main diagonal ($D = E\{d\, d^H\}$). Thus, from the estimated covariance matrix $R_{est}$, an estimated gain $g_{est}$ and noise $D_{est}$ can be deduced, because $R_{est} = g_{est}\, g_{est}^H + D_{est}$. In this model [1] it is assumed that the source power is unity.

The estimated gain and estimated noise are then derived by minimising in step 205 and 206 by an optimisation device 55 communicatively connected to the estimator device 54 and a memory device 56 in which the model is stored, a difference between the estimated covariance matrix $R_{est}$ and the model of the covariance matrix R, which difference is also referred to as the estimation error. A generally used approach thereto is to minimize the least squares (LS) cost function:

$$\{g_{est}, D_{est}\} = \mathrm{argmin}_{g,D}(\|R_{est} - (g\, g^H + D)\|_F)^2 \quad (B4)$$

where subscript F denotes the Frobenius matrix norm. In [1] the minimization is done by solving $$\{g_{est}\} = \mathrm{argmin}_{g,k}(\|J\, vec(ln(R_{est}) - ln(g\, g^H) + 2\pi ki)\|_F)^2$$

where J is a selection matrix which puts zeros on the main diagonal elements, thereby removing the system noise contributions, where k is a phase unwrapping vector containing integer values, and where vec( ) is a matrix operator stacking the matrix elements in a vector. Once the gains gest are found, the noise matrix is found by $$D_{est} = R_{est} - g_{est}\, g_{est}^H \quad (B5)$$

In the example of FIGS. 2 and 4, a weighted logarithmic least square cost function (WLOGLS) is used. The WLOGLS is equal to:

$$\{g_{est}\} = \mathrm{argmin}_{g,k}(\|W\, J\, vec(ln(R_{est}) - ln(g\, g^H) + 2\pi ki)\|_F)^2 \quad (B6)$$

W represents a weighting matrix equal to $(D^{-1/2}\Gamma) \otimes (D^{-1/2}\Gamma)$, in which $\Gamma$ is defined as $\mathrm{diag}(|g_1|, \ldots |g_p|)$, i.e. $\Gamma$ is a diagonal matrix with values of the diagonal elements set to the absolute value of the, estimated, gain factors $g_1, g_2, \ldots, g_p$. Here $\otimes$ denotes the Kronecker matrix product. For a low Signal to Noise Ratio (SNR), the SNR is substantially equal to $g\, g^H/\mathrm{trace}(D)$, it can be proved (not shown here) that the gain estimation is asymptotically efficient, which means that the estimation accuracy, for a large number of observed samples, meets the theoretical bound (i.e. it means that it theoretically can not be estimated more accurately)

To obtain a fast and reliable estimate, the least square optimisation can be performed in a number of times. In the shown example, the optimisation is performed two times in steps 205 and 206. In step 205, an estimate is obtained of the gain g and noise D by observing the point source and using the identity matrix I as a weight matrix. In step 206, the gains are estimated using the weight matrix constructed as described above using the estimated gain $g_{est}$ and noise $D_{est}$ estimated in step 205.

The calibration method of this example B works especially well for low SNR and also for arrays in which the antenna gains have a wide gain magnitude variation. The latter is also useful for gain estimation in the case part of the antennas (due to for example malfunctioning) have very low SNR.

A method or device according to the invention may be applied in any array signal processing system, such as systems in which a dominant point-like emitting source is present. For example, a method or a device according to the invention can be used in cellular telephone base stations, phased array antennas or otherwise. Also, the invention may be applied for calibration of a directional hearing device, comprising an array of microphones which can for example be phase-tuned to receive acoustical signals from a certain direction and reject or filter out signals from other directions. Furthermore, the signals to be sensed by the sensor array may be of any suitable type, such as for example radio signals, acoustical signals, optical signals or otherwise. Likewise, the signal source may be of any suitable type, such as a satellite in orbit around a celestial body or a pulsar. In general, pulsars are extremely precise pulsating celestial bodies and hence with a sensor array directed to a pulsar a precise time-measuring device can be obtained.

Furthermore, the invention can likewise be applied as a data carrier comprising data representing a computer program product, comprising program code for performing steps of a method according to the invention when run on a programmable device. Such a data carrier can for example be a read only memory compact disk or a signal transfer medium, such as a telephone cable or a wireless connection. The programmable device may be of any suitable type. For example, it may be a computer communicatively connected to a senor array. However, the computer may likewise be not connected to a sensor array, but receive data representing signals from the array, e.g. via a floppy disk or a compact disk.

It should be noted that the above-mentioned embodiments illustrate rather than limit the invention, and that those skilled in the art will be able to design may alternatives without departing from the scope of the appended claims. In the claims, any reference signs placed between parentheses shall not be construed as limiting the claim. The word 'comprising' does not exclude the presence of other elements or steps than those listed in a claim. The mere fact that certain measures are recited in mutually different claims does not indicate that a combination of these measures cannot be used to advantage. Furthermore, if a document is referenced to in this application, this does not indicate that the document relates to the same field of technology as the present invention.

REFERENCES

[1] A. J. Boonstra and A. J. van der Veen, "Gain Decomposition Methods for Radio Telescope Arrays", IEEE Workshop on Statistical Signal Processing (SSP), August, 2001.

[2] B. Ottersten, P. Stoica, and R. Roy, "Covariance matching estimation techniques for array signal processing applications", *Digital Signal Processing, a review journal*, vol. 8, pp. 185–210, 1998.

[3] P. Stoica, B. Ottersten, M. Viberg, and R. Moses, "Maximum likelihood array processing for stochastic coherent sources", *IEEE Transactions on Signal Processing*, vol. 44, pp. 96–105, January 1996.

[4] A. Leshem, A. J. van der Veen and A. J. Boonstra, Multichannel interference mitigation techniques in radio astronomy', Astrophysical Journal Supplements, vol. 131, no. 1, pp. 355–374, November 2000.

[5] A. Leshem and A. J. van der Veen, Multichannel detection of Gaussian signals with uncalibrated receivers, IEEE Signal Processing Letters, 2001, April, volume 8, pages 120–122.

[6] D. N. Lawley and A. E. Maxwell, Factor Analysis as a Statistical Method, Butterworth & Co, London, 1971, ch. 4.

[7] H. Krim and M. Viberg, Two Decades of Array Signal Processing Research), IEEE Signal Processing Magazine, 1996.

[8] S. M. Kay, Fundamentals of Statistical Signal Processing: Estimation Theory, Prentice Hall, Inc., 1993, volume 1, New Jersey, ch. 3.

[9] P. E. Gill and W. Murray and M. H. Wright, Practical Optimization, Academic Press, 1995, London, UK.

[10] J. P. Hamaker, J. D. Bregman, and R. J. Sault, "Understanding radio polarimetry. I. Mathematical foundations", Astron. Astrophysics. Suppl. Ser., vol. 117, pp 137–147, May 1996.

[11] J. P. Hamaker, "Understanding radio polarimetry. IV. The full-coherency analogue of scalar self-calibration: Self-alignment, dynamic range and polarimetric fidelity", Astron. Astrophysics. Suppl. Ser., vol. 143, pp. 515–534–147, May 2000.

[12] R. J. Sault, J. P. Hamaker, and J. D. Bregman, "Understanding radio polarimetry. II. Instrumental calibration of an interferometer array", Astron. Astrophys. Suppl. Ser. vol. 117, pp. 149–159, 1996.

[13] D. R. Fuhrmann, "Estimation of sensor gain and phase", IEEE Transactions on Signal Processing, Volume: 42 Issue: 1, Jan. 1994.

[14] L. Ljung, *System Identification: Theory for the user*. Upper Saddle River (N.J.): Prentice Hall, 1989, ch. 9.

[15] R. C. Jones, J. Opt. Soc. America 31, 1941, pp. 488–493.

[16] D. Clarke, J. F. Grainger, Polarized light and optical measurement, vol. 35, Pergamon Press, 1971, pp. 17–42.

[17] J. D. Kraus, Radio Astronomy, Cygnus-Quasar books, 1986, ch. 4.

[18] A. R. Thompson, J. M. Moran, G. W. Swenson, Interferometry and Synthesis in Radio Astronomy, John Wiley and Sons, 1986, pp 97–106.

The invention claimed is:

1. A method for calibrating parameters of sensor elements in a sensor array, comprising the steps of:
receiving output signals of at least two sensor elements in reaction to an input signal from a signal source;
estimating a cross-correlation between the output signals of at least two of said sensor elements;
optimising a difference between the estimated cross-correlation and a cross-correlation model; and
estimating said parameters from the optimised difference;
wherein the cross-correlation model is represented by the following mathematical equation:

$$R = G\, B\, G^H + D$$

in which:
R represents a cross-correlation matrix,
G represent a gain matrix comprising gain parameters,
$G^H$ represents an Hermitian conjugate of the gain matrix,
D represents a ((block) diagonal) noise matrix comprising noise parameters and
B represents a matrix comprising information about the signal source.

2. A method as claimed in claim 1, wherein said difference is a least square difference.

3. A method as claimed in claim 1, wherein the cross-correlation is obtained by determining a time-averaged covariance matrix from the output signals.

4. A method as claimed in claim 1, wherein the sensor array is a single polarization or non-polarized sensor array.

5. A method as claimed in claim 1, wherein the sensor elements are dual polarization sensor elements for receiving a dual polarised signal.

6. A method as claimed in claim 1, wherein said method is performed for output signals of the sensor elements generated in reaction to input signals from at least three signal sources with different polarizations.

7. A method as claimed in claim 4, wherein said optimising comprises:
minimising a difference between a weighted logarithm of the estimated cross-correlation and a weighted logarithm of the cross-correlation and
estimating the gain of at least one of the sensor elements from said difference.

8. A method as claimed in claim 7, wherein the logarithm is weighted by a weighting matrix with matrix values relating to said gain parameters.

9. A method as claimed in claim 7, wherein said optimising and said estimating gain parameters are performed at least a first time and a second time, wherein in the first time an uniform weight is used for all output signals and in the second time the weight is used in dependence on the gain estimated in the first time for the respective output signals.

10. A method as claimed in claim 7, wherein said optimising comprises an operation as represented by the mathematical equation:

$$\{g_{est}\} = \mathrm{argmin}_{g,k}(\|W J\, vec(ln(R_{est}) - ln(g\, g^H) + 2\pi k i)\|_F)$$

in which equation:
$g_{est}$ represents the parameter to be estimated;
g represents a variable;
$g^H$ represents the Hermitian conjugate of the variable;
J represent a selection matrix which puts zeros on the main diagonal;
k represents a phase unwrapping vector containing integer values;
W represents a weighting matrix; and
$R_{est}$ represents the estimated cross-correlation.

11. A method as claimed in claim 1, wherein the signal source is a satellite in orbit around a celestial body.

12. A method as claimed in claim 1, wherein the signal source is a pulsar.

13. A method as claimed in claim 1, wherein the output signals have a low signal to noise ratio.

14. A method as claimed in claim 1, wherein the sensor elements are antennas in a phased array antenna.

15. A method as claimed in claim 1, wherein the sensor elements are electro-magnetic sensors elements.

16. A method as claimed in claim 1, wherein the sensor elements are acoustical sensor elements.

17. A calibration system for calibrating parameters of sensor elements in a sensor array, the system comprising:
- at least two inputs, each connectable to an output of a sensor element in a sensor array;
- a correlation estimator device for estimating a correlation between output signals of at least two of said sensor elements;
- an optimiser device for optimising a difference between the estimated cross-correlation and a cross-correlation model and estimating said parameters from the optimised difference; and
- a memory device containing the cross-correlation model, the model being represented by the following mathematical equation:

$$R = G\,B\,G^H + D$$

in which:
- R represents a cross-correlation matrix,
- G represent a gain matrix comprising gain parameters,
- $G^H$ represents an Hermitian conjugate of the gain matrix,
- D represents a noise matrix comprising noise parameters and
- B represents a matrix comprising information about the signal source.

18. A calibration system as claimed in claim 17, wherein the sensor array is a dual polarised sensor array.

19. A calibration system as claimed in claim 17, wherein the sensor array is a single polarization or non-polarized sensor array.

20. An array signal processing system having sensor elements and a calibration system for calibrating the sensor elements, the calibration system comprising:
- a device for receiving output signals of at least two sensor elements in reaction to an input signal from a signal source;
- a correlation estimator device for estimating a cross-correlation between the output signals of at least two of said sensor elements;
- an optimiser device for optimising a difference between the estimated cross-correlation and a cross-correlation model; and
- an estimator device for estimating said parameters from the optimised difference;
- wherein the cross-correlation model is represented by the following mathematical equation:

$$R = G\,B\,G^H + D$$

in which:
- R represents a cross-correlation matrix,
- G represent a gain matrix comprising gain parameters,
- $G^H$ represents an Hermitian conjugate of the gain matrix,
- D represents a ((block) diagonal) noise matrix comprising noise parameters, and
- B represents a matrix comprising information about the signal source.

21. A computer program having computer executable instructions and stored in a computer readable medium and which, when the instructions are executed by a programmable computer, perform the steps of:
- receiving output signals of at least two sensor elements in reaction to an input signal from a signal source;
- estimating a cross-correlation between the output signals of at least two of said sensor elements;
- optimising a difference between the estimated cross-correlation and a cross-correlation model; and
- estimating said parameters from the optimised difference;
- wherein the cross-correlation model is used as represented by the following mathematical equation:

$$R = G\,B\,G^H + D$$

in which:
- R represents a cross-correlation matrix,
- G represent a gain matrix comprising gain parameters,
- $G^H$ represents an Hermitian conjugate of the gain matrix,
- D represents a ((block) diagonal) noise matrix comprising noise parameters and
- B represents a matrix comprising information about the signal source.

22. A computer readable medium having computer executable instructions stored therein, said instructions, when being executed by a computer, perform the steps of:
- receiving output signals of at least two sensor elements in reaction to an input signal from a signal source;
- estimating a cross-correlation between the output signals of at least two of said sensor elements;
- optimising a difference between the estimated cross-correlation and a cross-correlation model; and
- estimating said parameters from the optimised difference;
- wherein the cross-correlation model is used as represented by the following mathematical equation:

$$R = G\,B\,G^H + D$$

in which:
- R represents a cross-correlation matrix,
- G represent a gain matrix comprising gain parameters,
- $G^H$ represents an Hermitian conjugate of the gain matrix,
- D represents a ((block) diagonal) noise matrix comprising noise parameters and
- B represents a matrix comprising information about the signal source.

* * * * *